US010590039B2

United States Patent
Nuñez Lopez

(10) Patent No.: US 10,590,039 B2
(45) Date of Patent: Mar. 17, 2020

(54) FORMULATION AND METHOD FOR PRODUCING ULTRA-HIGH-PERFORMANCE CONCRETES

(71) Applicant: CEMENTOS ARGOS S.A., Medellin (CO)

(72) Inventor: Andres Mauricio Nuñez Lopez, Medellin (CO)

(73) Assignee: CEMENTOS ARGOS S.A., Medelin (CO)

( * ) Notice: Subject to any disclaimer, the term of this patent is extended or adjusted under 35 U.S.C. 154(b) by 0 days.

(21) Appl. No.: 15/781,949

(22) PCT Filed: Dec. 6, 2016

(86) PCT No.: PCT/IB2016/057385
§ 371 (c)(1),
(2) Date: Jun. 6, 2018

(87) PCT Pub. No.: WO2017/098409
PCT Pub. Date: Jun. 15, 2017

(65) Prior Publication Data
US 2018/0354850 A1    Dec. 13, 2018

(30) Foreign Application Priority Data
Dec. 7, 2015   (CO) .................................. 15291023

(51) Int. Cl.
| | | |
|---|---|---|
| *C04B 14/48* | (2006.01) | |
| *C04B 28/04* | (2006.01) | |
| *C04B 7/02* | (2006.01) | |
| *C04B 14/06* | (2006.01) | |
| *C04B 14/28* | (2006.01) | |
| *C04B 18/14* | (2006.01) | |
| *C04B 40/00* | (2006.01) | |
| *C04B 103/32* | (2006.01) | |

(52) U.S. Cl.
CPC ................ *C04B 14/48* (2013.01); *C04B 7/02* (2013.01); *C04B 14/06* (2013.01); *C04B 14/28* (2013.01); *C04B 18/146* (2013.01); *C04B 28/04* (2013.01); *C04B 40/0032* (2013.01); *C04B 40/0046* (2013.01); *C04B 2103/32* (2013.01); *C04B 2201/52* (2013.01)

(58) Field of Classification Search
CPC .......... C04B 7/02; C04B 14/06; C04B 14/28; C04B 14/48; C04B 18/146; C04B 28/04; C04B 40/0032; C04B 40/0046; C04B 2103/32; C04B 2201/52
See application file for complete search history.

(56) References Cited

U.S. PATENT DOCUMENTS

| | | | | |
|---|---|---|---|---|
| 7,901,504 | B2 * | 3/2011 | Batoz ...................... | C04B 28/04 106/644 |
| 9,115,026 | B2 * | 8/2015 | Tanaka .................... | C04B 28/04 |
| 9,926,234 | B2 * | 3/2018 | Toussaint ................ | C04B 7/527 |

FOREIGN PATENT DOCUMENTS

| | | | | |
|---|---|---|---|---|
| CN | 104446264 A | * | 3/2015 | |
| CN | 104876500 A | * | 9/2015 | |
| CN | 104891889 A | * | 9/2015 | |
| EP | 1876153 | | 1/2008 | |
| EP | 2275390 A1 | * | 1/2011 | ............. C04B 28/04 |
| ES | 2288171 | | 1/2008 | |

OTHER PUBLICATIONS

Osorio, D. et al., Influencia del proceso de fabricaction sobre las propiedades de los concretos de ultra alto desempeno (UHPC), Jun. 2015, 97 pages. English abstract included.
Chandra, L. et al., The impact of using fly ash, silica fume and calcium carbonate on the workability and compressive strength of mortar, Procedia Engineering, ScienceDirect, 2015, 7 pages.
Yazici, H., The effect of curing conditions on compressive strength of ultra high strength concrete with high volume mineral admixtures. Building and Environment, 2007, 42: 2083-2090.
Ranade, R. et al., Composite Properties of High-Strength, High-Ductiility Concrete, ACI Materials Journal, 2013, 413-422, 11 pages.
Gonzalez, N. et al., Influencia del volumen de fibras y curado posterior sobre el comportamiento post-fisura de un concreto de ultra alto desempeno. Rev. Ing. Constr., 2014, vol. 29 No. 3, 220-233. English abstract included.
Marzouki, A. et al., The effects of grinding on the properties of Portland-limestone cement, Construction and Building Materials, 2013, 48: 1145-1155.
PCT International Search Report and Written Opinion, dated Apr. 3, 2017, 12 pages.
English translation of PCT International Preliminary Report on Patentability Chapter II, dated Jun. 7, 2018,13 pages.
PCT International Preliminary Report on Patentability, dated Mar. 28, 2018, 31 pages.

* cited by examiner

*Primary Examiner* — Anthony J Green
(74) *Attorney, Agent, or Firm* — Barnes & Thornburg LLP

(57) ABSTRACT

A formulation and method for obtaining ultra-high performance concretes, which provide a concrete with good mechanical properties of, inter alia, traction, compression, deformation, durability, ductility and toughness, with reduced related costs.

4 Claims, No Drawings

FORMULATION AND METHOD FOR PRODUCING ULTRA-HIGH-PERFORMANCE CONCRETES

CROSS-REFERENCE TO RELATED APPLICATIONS

This application is a national stage entry under 35 U.S.C. § 371 of PCT International Application No. PCT/IB2016/057385, filed Dec. 6, 2016, and claims priority to Colombia Patent Application No. 15291023, filed Dec. 7, 2015, the disclosures of which are expressly incorporated by reference in their entirety.

STATE OF THE ART OF THE INVENTION

Field of the Invention

The present invention relates to the field of the cement industry, and more particularly refers to an ultra-high performance concrete formulation and method of obtaining said concretes, that allows to carry out a concrete with good mechanical properties of compression, traction, deformation, high durability, ductility and toughness, in a practical, fast and safe way, reducing related costs.

Description of Prior Art

In order to better understand the object and scope of the present invention, it is convenient to describe the current state of the art in reference to ultra-high performance concretes and the inconveniences that arise.

The ultra-high performance concretes CUAD (acronym in Spanish) or UHPC (acronym in English), are well known in the field of art and it is known that they allow better mechanical properties compared to conventional concrete or high performance concrete. Over the years, a variety of studies and tests have been carried out that have determined different ultra-high performance concretes.

As an example, we can mention the ultra-high performance concrete with high proportions of short fibers, that is, a compact reinforced concrete. Where, the fiber content for this concrete is between 5 and 10% by volume, and the fibers do not exceed 6 mm in length. When the fibers are added, the tensile strength of the concrete is improved, but they little contribute to increase the ductility. The material, therefore, is used in structures with high percentages of traditional reinforcing rods.

In another embodiment, there are ultra-high performance concretes with intermediate portions of long fibers. The fiber content for these concretes varies between 2 and 3% by volume, and the fibers are between 13 and 20 mm long. The fibers improve the tensile strength and ductility of the concrete and are intended to replace all or a portion of the reinforcing rods that would normally be used in reinforced concrete elements.

In a third embodiment, the ultra-high performance concretes with very high proportions of fibers of various lengths can be mentioned. Wherein, the fiber content of this concrete can be up to 11% by volume and the short fibers can vary from 1 to 20 mm in length. The fibers significantly increase both the tensile strength and the ductility of the concrete, and can replace all the traditional reinforcing rods in one element. As with fiber-reinforced composites that are formed using an organic matrix, the matrix of such a concrete transfers stresses between the fibers and ensures certain physical and chemical properties of the material.

Although, the technological developments applied in concrete have resulted in a better and greater understanding of the concrete micro-structure, they are not yet used in the construction industry in a large number of countries. This is due to their high manufacturing costs, lack of manufacturing processes and lack of dissemination, for example in Colombia under the seismic-resistant norm of Colombia, NSR-10, it also has the disadvantages that in some cases they use more than seven (7) components in their elaboration, no use of supplementary cement or the use of high-cost supplemental cementitious materials and ignorance of the mixing and placement processes.

By virtue of the current state of the art available for ultra-high performance concrete, it would be very convenient to have a new formulation and obtaining method that allows a concrete with good mechanical properties, low related costs and that can be carried out in any region of the world without the need for special components.

BRIEF DESCRIPTION OF THE INVENTION

It is therefore an object of the present invention to provide a new formulation and method of obtaining ultra-high performance concretes that allows achieving good mechanical properties of compression, toughness, traction, durability, ductility, and deformation among many others.

It is still another object of the present invention to provide an ultra-high performance concrete that can be obtained in any region of the world, without the need to use special elements for obtaining the same, thus reducing the related costs.

It is also another object of the present invention to provide an ultra-high performance concrete formulation comprising: Portland Cement in an amount between 19% to 29%; calcium carbonate in an amount between 6.5% to 16.5%; silica fume in an amount between 5.5% to 15.5%; silica sand in an amount between 22% to 32%; water in an amount between 15% to 25%; high range water regulating additives in an amount between 1.5% to 3.0%; and metallic fibers in an amount between 1.5% to 2.5%.

It is still another object of the present invention to provide a method for obtaining ultra-high performance concretes comprising the steps of: premixing a quantity of Portland cement with calcium carbonate and silica fume to form a premix, loading, into a mixer, an amount of water with a high rank water reducing additive and mixing at a speed of between 100 to 3000 RPM during 1 to 2 minutes, adding the premix into the mixer, mixing the premix in conjunction with the water additive mixture until reaching the time of fluidity, once the fluidity is reached, mixing for 1.5 to 2.5 minutes at maximum speed, adding into the mixer an amount of sand during 0.5 to 1.5 minutes and mixing during 2 to 4 minutes at maximum speed, stopping the mixer, scraping the inside of the mixer until the mix of sand and fluid mixture is removed, restarting the mixing process by mixing at maximum speed for 2 to 3 minutes until obtaining a final semi-material, stopping the mixer, adding an amount of metallic fiber for 0.5 to 1.5 minutes, continuing the process of mixing the final semi-material with the metal fibers at a maximum speed for 1 to minutes until obtaining a desired consistency, and downloading the obtained concrete material.

DETAILED DESCRIPTION OF THE INVENTION

Referring now to the invention, it consists of a formulation and method of obtaining ultra high performance concretes that achieves a concrete with good mechanical properties of traction, compression, deformation, ductility, toughness, and durability among many other characteristics. Likewise, the formulation of the present invention uses elements that allow the reduction of the related costs. Thus, the ultra high performance concrete formulation of the present invention may comprise:

Portland Cement in an amount between 19% to 29%; calcium carbonate in an amount between 6.5% to 16.5%; silica fume in an amount between 4.5% to 15.5%; silica sand in an amount between 22% to 35%; water in an amount between 15% to 25%; high range water regulating additives in an amount between 1.5% to 2.5%; and metallic fibers in an amount between 1.5% to 2.5%, with the fibers having lengths between 13 mm to 60 mm and diameters between 0.3 mm to 0.75 mm. Depending on the application, mixtures of fibers with different lengths are employed, wherein mixtures of short fibers and long fibers can be used.

Wherein, said water regulating additive can be a high-range water-reducing superplasticizer additive which can be selected from the group consisting of Master Glenium 7920, Glenium 356, UHF 7350-2 Sikaviscocrete and Sika viscocrete 5e-c3, this being not limiting for the invention, but the other materials can also be considered and used for the present invention. It is noted that, although silica sand is used in the present invention, this does not imply that the invention is limited thereto, but that other types of sands well known in the art can be considered and used in the present invention, being for example silica sands, quartz sands, quartz powder, etc.

Thus, among the advantages of the present formulation we find that adding calcium carbonate favors the resistance gain at later ages, in addition to the increase in manageability favoring transport times. The high levels of material handling allow for self-compacting and self-leveling behavior.

On the other hand, several formulations have been prepared according to the present invention that have proved to be effective and on which the following non-limiting examples of the invention will be provided. Such examples comprise the components and their test percentages that fall within the ranges indicated above.

Example 1

In a first preferred embodiment, the ultra high performance concrete formulation of the present invention has been prepared with the following components and percentages:

Portland Cement in an amount of 20%;
calcium carbonate in an amount of 16.5%;
silica fume in an amount of 10%;
silica sand in an amount of 24.5%;
water in an amount between of 25%;
high range water regulating additives in an amount of 2.5%; and
metallic fibers in an amount of 1.5%.

Under this formulation, we have surprisingly obtained a concrete with mechanical compression properties fc=100-110 MPa, tensile stress=1-3 MPa, and deformation d=0.8%. Likewise, the concrete obtained has demonstrated a remarkable ductility (micro-cracking), with high durability and toughness.

Example 2

In a second preferred embodiment, the product of the ultra high performance concrete formulation of the present invention has been prepared with the following components and percentages:

Portland Cement in an amount of 24%;
calcium carbonate in an amount of 11.5%;
silica fume in an amount of 10.5%;
silica sand in an amount of 27%;
water in an amount between of 22.5%;
high range water regulating additives in an amount of 2.5%; and
metallic fibers in an amount of 2%.

Under this formulation, surprisingly a concrete has been obtained with mechanical properties of fc=140-170 MPa for compression, of ft=7-10 MPa for traction, and of d=1% for deformation. Likewise, the obtained concrete has shown a remarkable ductility (micro-cracking), with high durability and toughness.

Example 3

In a third preferred embodiment, the product of the ultra high performance concrete formulation of the present invention has been prepared with the following components and percentages:

Portland Cement in an amount of 24.02%;
calcium carbonate in an amount of 11.48%;
silica fume in an amount of 10.44%;
silica sand in an amount of 29%;
water in an amount between of 21.15%;
high range water regulating additives in an amount of 1.9%; and
metallic fibers in an amount of 2%.

Under this formulation, surprisingly a concrete has been obtained with mechanical properties of fc=165-175 MPa for compression, of ft=9-10 MPa for tensile stress, and d=1.1% for deformation. Likewise, the obtained concrete has demonstrated a remarkable ductility (micro-cracking), with high durability and toughness.

On the other hand, the present invention aims to provide a method for obtaining ultra-high performance concrete, which comprises a first stage of pre-mixing an amount of between 19% to 29% of Portland Cement with an amount of between 6.5% to 16.5% of calcium carbonate and an amount of between 4.5% to 15.5% of silica fume to form a premix. Then, an amount of 15% to 25% of water with an amount of between 1.5% to 3.0% of high-range water reducing additives is charged in a mixer and mixed at a speed of between 100 to 3000 RPM for 1 to 2 minutes. After that time, we proceed to add the premix of Portland cement—calcium carbonate—silica fume in the mixer.

Then, mixing of the premix is carried out in conjunction with the water-additive mixture until the flow time is reached. Once the fluidity is reached, it must be mixed for 1.5 to 2.5 minutes at maximum speed.

Likewise, a quantity of sand is loaded in a skip or loader which transports the sand to the mixer. When sufficient height is reached, the sand is added to the mixer, adding an amount of between 22% to 35% sand for 0.5 to 1.5 minutes and then mixing for 2 to 4 minutes at maximum speed. Then, the mixer is stopped and the inside of the mixer is scraped until the mixture of sand is mixed with the fluid mixture. Once the removal stage is finished, we proceed to restart the mixing process, mixing at maximum speed for 2 to 3 minutes until a final semi-material is obtained, then the mixer is stopped, and properties in this fresh material are evaluated. Once the evaluation is completed and the properties are correct, an amount of 1.0 to 3.0% of metallic fibers is added during 0.5 to 1.5 minutes. Next, the process of mixing the final semi-material together with the metal fibers at maximum speed for 1 to 3 minutes is continued until obtaining a desired consistency, and the obtained material is discharged.

During the stage of unloading of the concrete material, the concrete properties measurement in fresh state is carried out.

In a preferred embodiment, the step of mixing an amount of water with a high-range water reducing additive can be carried out for 1.5 minutes. The stage of mixing the mixture, once fluidity is achieved, can be carried out for 2 minutes. The step of adding sand in the mixer can be carried out for 1 minute, and mixed for 3 minutes. The step of adding the metal fiber can be carried out for 1 minute, while the step of mixing the mixture of the final semi-material with the metal fibers can be carried out for 2 minutes.

In this way, the formulation and method of obtaining ultra-high performance concretes of the present invention are constituted, which allow a concrete of good mechanical properties with low related costs. Likewise, it is emphasized that the method of the invention is of utmost importance because the times and the order of how the materials are mixed must be controlled in order to achieve an ultra-high performance concrete with the aforementioned mechanical properties. At the same time, depending on the mixer used and its mixing energy, it has been decided to shorten the mixing times and it has been considered a wet process, based on activities. Furthermore, among the advantages of the invention it is the low cost of the supplementary cementing materials used and the use of seven (7) low cost components for its manufacture. This concrete will allow to direct the constructions and the designs towards a more sustainable environment since it allows lower material consumption and lower maintenance of the structures.

All the percentages employed in the present application, related to the components of the formulation, are volume percentage concentrations. All the fc values mentioned in the Examples were measured after 28 days.

Having thus specially described and determined the nature of the present invention and the manner in which it is to be put into practice, the following is claimed as property and exclusive right:

1. An ultra high performance concrete formulation comprising:
   Portland Cement in an amount between 24% to 29% v/v;
   calcium carbonate in an amount between 11.5% to 16.5% v/v;
   silica fume in an amount between 10.5% to 15.5% v/v;
   silica sand in an amount between 27% to 35% v/v;
   water in an amount between 22.5% to 25% v/v;
   high range water regulating additives in an amount between 2.5% to 3.0% v/v; and
   metallic fibers in an amount between 2% to 2.5% v/v.

2. The ultra high performance concrete formulation of claim 1, wherein said water regulating additive is a high range water reducing super plasticizer additive.

3. The ultra high performance concrete formulation of claim 1, comprising:
   Portland Cement in an amount of 24% v/v;
   calcium carbonate in an amount of 11.5% v/v;
   silica fume in an amount of 10.5% v/v;
   silica sand in an amount of 27% v/v;
   water in an amount between of 22.5% v/v;
   high range water regulating additives in an amount of 2.5% v/v; and
   metallic fibers in an amount of 2% v/v.

4. The ultra high performance concrete formulation of claim 1, comprising:
   Portland Cement in an amount of 24.02% v/v;
   calcium carbonate in an amount of 11.48% v/v;
   silica fume in an amount of 10.44% v/v;
   silica sand in an amount of 29% v/v;
   water in an amount between of 21.15% v/v;
   high range water regulating additives in an amount of 1.9% v/v; and
   metallic fibers in an amount of 2% v/v.

* * * * *